(12) United States Patent
Yoo et al.

(10) Patent No.: US 10,144,993 B2
(45) Date of Patent: Dec. 4, 2018

(54) CATALYST FOR OXYGEN REDUCTION REACTION AND PREPARATION METHOD OF THE SAME

(71) Applicant: KOREA INSTITUTE OF SCIENCE AND TECHNOLOGY, Seoul (KR)

(72) Inventors: Sung Jong Yoo, Seoul (KR); Jong Hyun Jang, Seoul (KR); Hyoung-Juhn Kim, Seoul (KR); Namgee Jung, Seoul (KR); Suk Woo Nam, Seoul (KR); Jonghee Han, Seoul (KR); Sung Pil Yoon, Seoul (KR); Jaeyune Ryu, Seoul (KR); Tae Hoon Lim, Seoul (KR); Jin Young Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/918,486

(22) Filed: Oct. 20, 2015

(65) Prior Publication Data
US 2016/0222488 A1 Aug. 4, 2016

(30) Foreign Application Priority Data
Jan. 29, 2015 (KR) .......................... 10-2015-0014254

(51) Int. Cl.
*C22C 5/04* (2006.01)
(52) U.S. Cl.
CPC ...................................... *C22C 5/04* (2013.01)
(58) Field of Classification Search
None
See application file for complete search history.

(56) References Cited

U.S. PATENT DOCUMENTS

| | | |
|---|---|---|
| 2006/0008697 A1 | 1/2006 | Kim et al. |
| 2012/0028790 A1 | 2/2012 | Roh et al. |
| 2012/0135137 A1 | 5/2012 | Roh et al. |
| 2014/0055027 A1 | 2/2014 | Ger et al. |
| 2015/0021511 A1 | 1/2015 | Kim et al. |

FOREIGN PATENT DOCUMENTS

| | | |
|---|---|---|
| KR | 2006-0004780 A | 1/2006 |
| KR | 10-1071924 B1 | 10/2011 |
| KR | 10-2012-0021422 A | 3/2012 |
| KR | 10-2012-0057432 A | 6/2012 |
| KR | 10-2012-0139563 A | 12/2012 |
| KR | 10-2013-0087248 A | 8/2013 |
| KR | 10-2013-0088602 A | 8/2013 |
| KR | 10-2014-0052271 A | 5/2014 |

OTHER PUBLICATIONS

Mukerjee et al. Journal Electroanalytical Chemistry, 357, 1993, 201-224.*
Kyuhwan Hyun et al., Improvement in oxygen reduction activity of polypyrrole-coated PtNi alloy catalyst prepared for proton exchange membrane fuel cells, Synthetic Metals, Feb. 25, 2014, pp. 48-55, vol. 190.
Namgee Jung et al., High-Performance Hybrid Catalyst with Selectively Functionalized Carbon by Temperature-Directed Switchable Polymer, Chemistry of Materials., Apr. 11, 2013, pp. 1526-1532, vol. 25.
Stamenkovic et al., "Trends in electrocatalysis on extended and nanoscale Pt-bimetallic alloy surfaces", Nature Materials, Mar. 2007, pp. 241-247, vol. 6.
Jung et al., "Pt-based nanoarchitecture and catalyst design for fuel cell applications", Nano Today, Jul. 25, 2014, pp. 433-456, vol. 9.

* cited by examiner

*Primary Examiner* — Yun Qian
(74) *Attorney, Agent, or Firm* — Goldilocks Zone IP Law

(57) ABSTRACT

Provided is a catalyst for oxygen reduction reaction comprising an alloy comprising at least one selected from Pt, Pd and Ir supported on a carbon carrier functionalized with poly(N-isopropylacrylamide) (PNIPAM). The catalyst for oxygen reduction reaction has electronic ensemble effects by virtue of the carbon carrier functionalized with poly(N-isopropylacrylamide) (PNIPAM), and thus shows improved oxygen reduction activity and durability as compared to conventional catalysts supported on carbon.

3 Claims, 12 Drawing Sheets

CATALYST FOR OXYGEN REDUCTION REACTION AND PREPARATION METHOD OF THE SAME

CROSS-REFERENCE TO RELATED APPLICATION

This application claims priority to Korean Patent Application No. 10-2015-0014254, filed on Jan. 29, 2015, and all the benefits accruing therefrom under 35 U.S.C. § 119, the contents of which in its entirety are herein incorporated by reference.

BACKGROUND

1. Field

The present disclosure relates to a catalyst for oxygen reduction reaction and a method for preparing the same. More particularly, the present disclosure relates to a catalyst for oxygen reduction reaction including carbon functionalized with poly(N-isopropylacrylamide) as a support, and a method for preparing the same.

[Description about National Support Research and Development]This study is made by the support of global frontier business of Korea Ministry of Science, ICT and Future Planning under the supervision of Korea Institute of Science and Technology, and the subject name thereof is Development of High-Quality/High-Durability Catalyst for Polymer Electrolyte Fuel Cells through Control of Nanostructure and Hybridization of Materials (2N39460) (Subject Identification No. :2014047511).

2. Description of the Related Art

Proton exchange membrane fuel cells (PEMFC) have been developed as the future energy conversion systems, since they can convert hydrogen gas directly into electricity without emission of pollutants. However, because the oxygen reduction reaction at a cathode has a large over-voltage, a large amount of Pt noble metal catalyst is required in order to obtain PEMFC having high electrochemical catalytic efficiency. In addition, it is difficult to increase the efficiency of a fuel cell merely by increasing the loading amount of Pt at a cathode through the subsidiary generation of concentration or different resistance, such as internal resistance, in a thick cathode. Therefore, a binary metal including Pt alloyed with a transition metal is used to increase the catalytic activity while reducing the use of Pt.

However, electron transfer from the transition metal to Pt in such a Pt-based alloy catalyst is inhibited by the formation of inevitable surface transition metal oxide caused by oxygen species having high electronegativity. Thus, there are problems in that the surface of a transition metal atom is oxidized with ease in the case of solution-based synthesis and catalysis in an acidic solution and that natural oxidation upon exposure to the air is hardly blocked without a separate blocking material.

REFERENCES

Non-Patent Documents

Stamenkovic, V. R. et al. Trends in electrocatalysis on extended and nanoscale Pt-bimetallic alloy surfaces. Nature Mater. 6, 241-247 (2007).

SUMMARY

The present disclosure is directed to providing a catalyst for oxygen reduction reaction having excellent oxygen reduction activity and durability by virtue of electronic ensemble effects provided by less electronegative nitrogen atoms attached intentionally to the surface of transition metal atoms so that they function instead of oxygen, as well as a method for preparing the same.

In one aspect, there is provided a catalyst for oxygen reduction reaction including an alloy comprising at least one selected from Pt, Pd and Ir supported on a carbon carrier functionalized with poly(N-isopropylacrylamide) (PNIPAM).

According to an embodiment, the alloy comprising at least one selected from Pt, Pd and Ir may be an alloy of a metal selected from the group consisting of Pt, Pd and Ir with a transition metal other than Pt, Pd and Ir.

According to another embodiment, the transition metal may be selected from the group consisting of Co, Ni, Fe, Cu, Cr and Mn.

According to still another embodiment, the alloy comprising at least one selected from Pt, Pd and Ir may be nanoparticles.

According to still another embodiment, the alloy comprising at least one selected from Pt, Pd and Ir may be nanoparticles having a particle diameter of 1-20 nm.

According to still another embodiment, the catalyst may be represented by the following Chemical Formula 1:

$$XY/C\text{-PNIPAM} \qquad \text{[Chemical Formula 1]}$$

wherein X is at least one selected from the group consisting of Pt, Pd and Ir, Y is at least one selected from the group consisting of Co, Ni, Fe, Cu, Cr and Mn, C is carbon, and PNIPAM is poly(N-isopropylacrylamide).

According to yet another embodiment, the alloy comprising at least one selected from Pt, Pd and Ir may be present in an amount of 10-60 wt % based on the total weight of the catalyst.

In another aspect, there is provided a method for preparing a catalyst for oxygen reduction reaction, the method including:

reacting carbon with amine-terminated poly(N-isopropylacrylamide) to obtain a carbon carrier functionalized with poly(N-isopropylacrylamide); and mixing a solvent in which the carbon carrier functionalized with poly(N-isopropylacrylamide) is dispersed with a precursor of a metal selected from the group consisting of Pt, Pd and Ir and a precursor of a metal selected from the group consisting of Co, Ni, Fe, Cu, Cr and Mn, and then carrying out reduction.

According to an embodiment, the carbon carrier functionalized with poly(N-isopropylacrylamide) may be obtained by mixing carbon with amine-terminated poly(N-isopropylacrylamide) and carrying out amidation by adding at least one catalyst selected from the group consisting of 1-ethyl-3-(3-dimethylaminopropyl)carbodiimide, N,N'-dicyclohexylcarbodiimide and N,N'-diisopropylcarbodiimide.

According to another embodiment, the precursor of a metal selected from the group consisting of Pt, Pd and Ir may be chloride of a metal selected from the group consisting of Pt, Pd and Ir.

According to still another embodiment, the precursor of a metal selected from the group consisting of Co, Ni, Fe, Cu, Cr and Mn may be chloride hydrate of a metal selected from the group consisting of Co, Ni, Fe, Cu, Cr and Mn.

The catalyst for oxygen reduction reaction disclosed herein has electronic ensemble effects by virtue of the carbon carrier functionalized with poly(N-isopropylacrylamide) (PNIPAM). Therefore, the catalyst has improved oxygen reduction activity and durability as compared to the conventional carbon-supported catalysts, and thus may be useful for proton exchange membrane fuel cells (PEMFC). In addition, such electronic ensemble effects generated from organic/inorganic hybridization at the atomic level may be applied to multi-functional hybrid heterometallic nanomaterials.

DETAILED DESCRIPTION

Figure 1A:
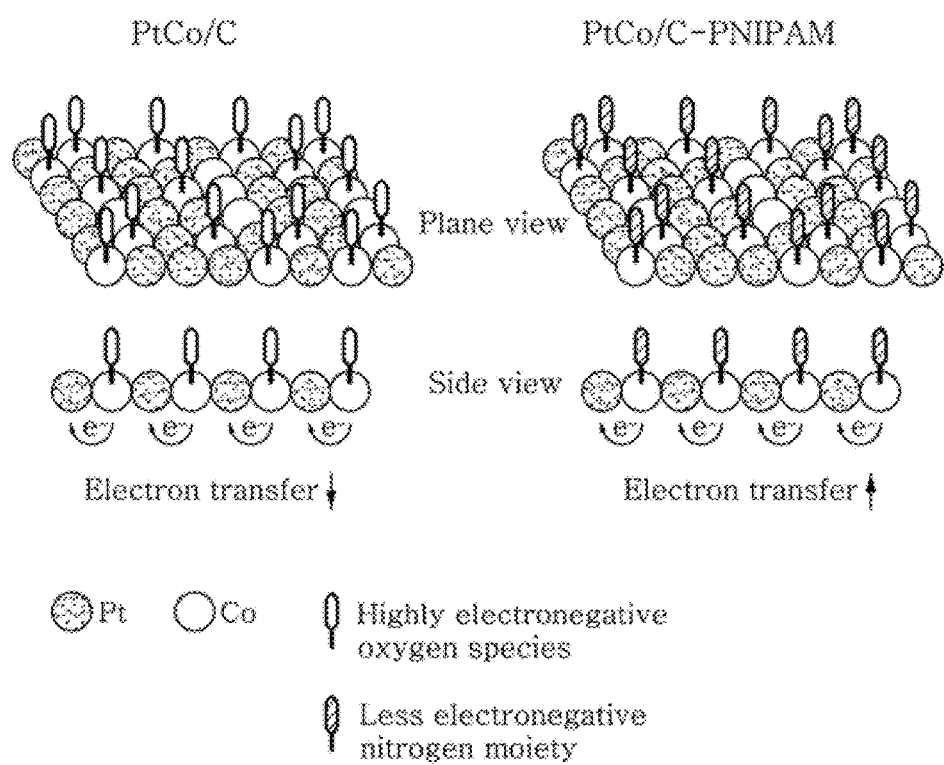
FIG. 1A to 1D show schematic view ((FIG. 1A) of selective tailoring of the surface of a Co atom with a nitrogen moiety on the surface of PtCo nanoparticles; UV-VIS absorption spectrum (FIG. 1 B); C K-edge near-edge X-ray absorption fine structure (NEXAFS) spectrum (FIG. 1C); and X-ray photoelectron spectroscopy (XPS) spectrum (FIG. 1D), in the catalyst for oxygen reduction reaction according to an embodiment.
Figure 1B:
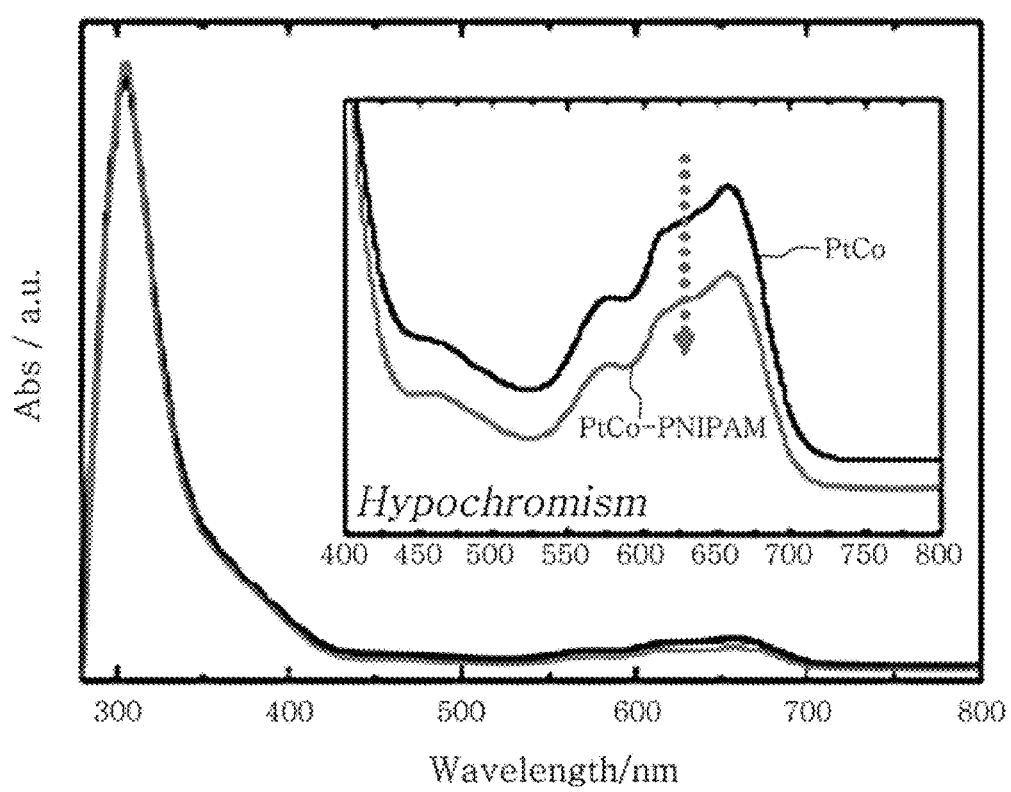
Figure 1C:
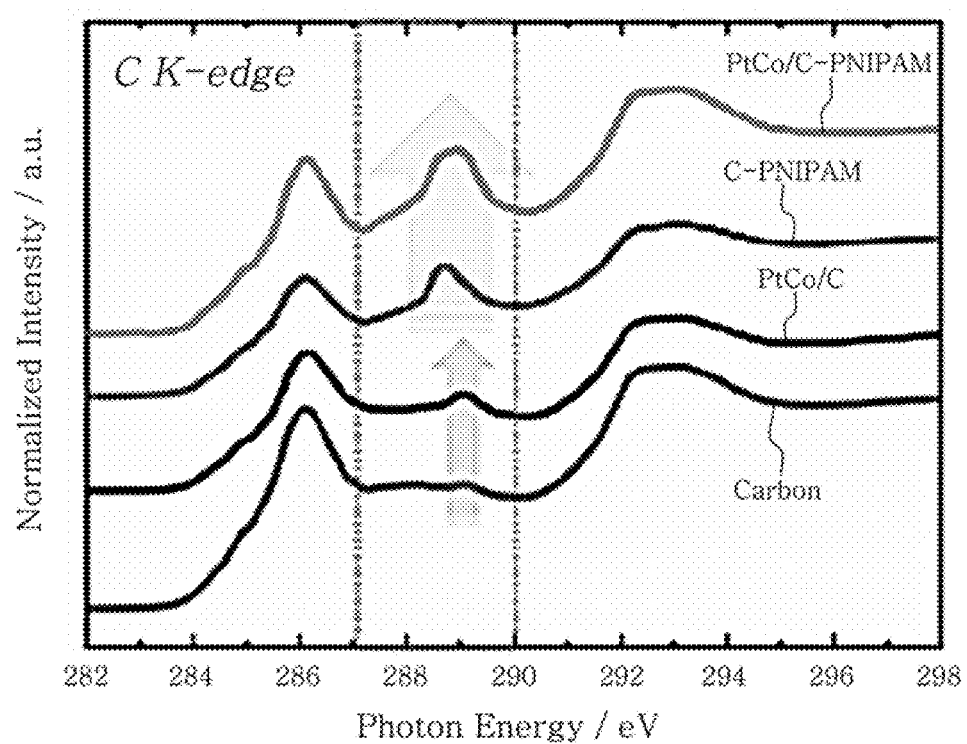
Figure 1D:
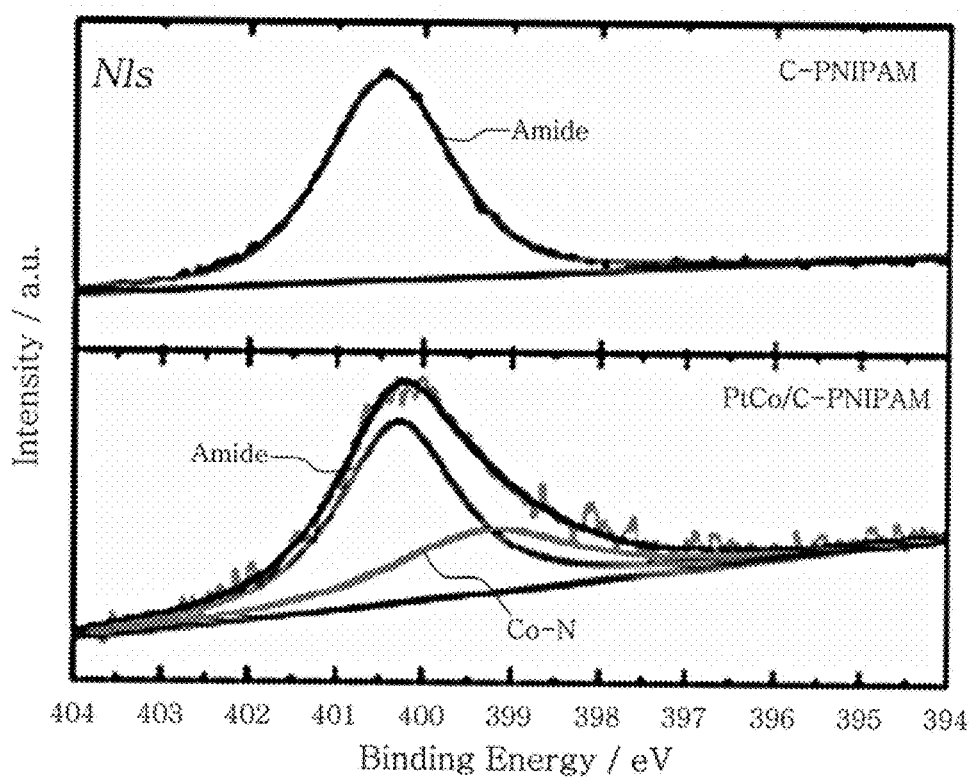

Exemplary embodiments now will be described more fully hereinafter so that the present disclosure will be thorough and complete, and will fully convey the scope of the present disclosure to those skilled in the art.

In one aspect, there is provided a catalyst for oxygen reduction reaction including an alloy comprising at least one selected from Pt, Pd and Ir supported on a carbon carrier functionalized with poly(N-isopropylacrylamide) (PNIPAM).

The catalyst for oxygen reduction reaction disclosed herein may be represented by the following Chemical Formula 1:

XY/C-PNIPAM [Chemical Formula 1]

wherein X is at least one selected from the group consisting of Pt, Pd and Ir, Y is at least one selected from the group consisting of Co, Ni, Fe, Cu, Cr and Mn, C is carbon, and PNIPAM is poly(N-isopropylacrylamide).

The alloy comprising at least one selected from Pt, Pd and Ir may be an alloy of a metal selected from the group consisting of Pt, Pd and Ir with a transition metal other than Pt, Pd and Ir. Particularly, the metal selected from the group consisting of Pt, Pd and Ir may be Pt, but is not limited thereto.

In addition, the transition metal other than Pt, Pd and Ir may be selected from the group consisting of Co, Ni, Fe, Cu, Cr and Mn. Particularly, the transition metal may be selected from the group consisting of Co, Ni and Fe. More particularly, the transition metal may be Co, but is not limited thereto.

In other words, the alloy comprising at least one selected from Pt, Pd and Ir may be XY, wherein X is at least one selected from the group consisting of Pt, Pd and Ir, and Y is at least one selected from the group consisting of Co, Ni, Fe, Cu, Cr and Mn. For example, the alloy comprising at least one selected from Pt, Pd and Ir may be PtCo, but is not limited thereto.

Herein, the alloy comprising at least one selected from Pt, Pd and Ir may be nanoparticles having a particle diameter of 1-20 nm. When the nanoparticles have a diameter less than 1 nm, the particles have low stability within a voltage range of oxygen reduction reaction and adsorption of oxygen species becomes strong, resulting in degradation of reaction activity. When the nanoparticles have a diameter larger than 20 nm, electrochemically active area is decreased rapidly, and thus high oxygen reduction current cannot be obtained.

In addition, the alloy comprising at least one selected from Pt, Pd and Ir may be present in an amount of 10-60 wt %, particularly 30-50 wt %, based on the total weight of the catalyst. When the alloy is present in an amount less than 10 wt %, the amount of catalyst used in a cathode becomes excessively large to increase the thickness of the electrode, resulting in a decrease in oxygen gas diffusion rate. When the alloy is present in an amount larger than 60 wt %, metal particles cover the most part of the carbon carrier, thereby making it difficult to maintain the shape of independent nanoparticles.

In the catalyst for oxygen reduction reaction disclosed herein, it is found that a nitrogen atom having low electronegativity is attached intentionally to the surface of a metal atom in order to increase the electron transfer from a transition metal to Pt, so that the nitrogen atom may function instead of oxygen, and the ion of a transition metal precursor may receive more electrons from a nitrogen moiety having an electron-donating group such as —$CH_3$. At the same time, the surface of a Pt atom providing an electrochemically active site to oxygen reduction reaction does not react with an additional material, and thus the catalyst shows excellent activity.

In another aspect, there is provided a method for preparing a catalyst for oxygen reduction reaction, the method including:

reacting carbon with amine-terminated poly(N-isopropylacrylamide) to obtain a carbon carrier functionalized with poly(N-isopropylacrylamide); and mixing a solvent in which the carbon carrier functionalized with poly(N-isopropylacrylamide) is dispersed with a precursor of a metal selected from the group consisting of Pt, Pd and Ir and a precursor of a metal selected from the group consisting of Co, Ni, Fe, Cu, Cr and Mn, and then carrying out reduction.

Particularly, carbon is reacted first with amine-terminated poly(N-isopropylacrylamide) to obtain a carbon carrier functionalized with poly(N-isopropylacrylamide).

The carbon carrier functionalized with poly(N-isopropylacrylamide) may be obtained by mixing carbon with amine-terminated poly(N-isopropylacrylamide) and carrying out amidation by adding at least one catalyst selected from the group consisting of 1-ethyl-3-(3-dimethylaminopropyl)carbodiimide, N,N'-dicyclohexylcarbodiimide and N,N'-diisopropylcarbodiimide.

Then, a solvent in which the carbon carrier functionalized with poly(N-isopropylacrylamide) is dispersed is mixed with a precursor of a metal selected from the group consisting of Pt, Pd and Ir and a precursor of a metal selected from the group consisting of Co, Ni, Fe, Cu, Cr and Mn, and then reduction is carried out.

The precursor of a metal selected from the group consisting of Pt, Pd and Ir may be chloride of a metal selected from the group consisting of Pt, Pd and Ir. For example, the Pt precursor may be $PtCl_4$, but is not limited thereto.

In addition, the precursor of a metal selected from the group consisting of Co, Ni, Fe, Cu, Cr and Mn may be chloride hydrate of a metal selected from the group consisting of Co, Ni, Fe, Cu, Cr and Mn. For example, the Co precursor may be $CoCl_2 \cdot 6H_2O$, but is not limited thereto.

Herein, the precursor of a metal selected from the group consisting of Pt, Pd and Ir may be present in a molar ratio of 70-90 mole %, particularly 72-82 mole %, and more particularly 77 mole %, based on the alloy. When the molar ratio is less than 70 mole %, the electrochemically active area becomes too small. When the molar ratio is larger than 90 mole %, it is not possible to obtain a sufficient effect of alloying a transition metal, such as Co.

In addition, the precursor of a metal selected from the group consisting of Co, Ni, Fe, Cu, Cr and Mn may be present in a molar ratio of 10-30 mole %, particularly 18-28 mole %, and more particularly 23 mole %, based on the alloy. When the molar ratio is less than 10 mole %, the effect upon Pt becomes very weak. When the molar ratio is larger than 30 mole %, the amount of electrochemically active Pt becomes small, resulting in a decrease in active area.

The catalyst for oxygen reduction reaction is provided as alloy nanoparticles supported on a carbon carrier functionalized with poly(N-isopropylacrylamide). In addition, the surface of transition metal atoms is tailored selectively with nitrogen moieties on the surface of the alloy nanoparticles (see, portion a of FIG. 1). For example, when preparing PtCo nanoparticles, poly(N-isopropylacrylamide) that is a linear polymer having amide groups is positioned along the carbon skeleton and reacts strongly only with a Co precursor and does not react with a Pt precursor. As a result, Co—N bonds are generated on the surface of PtCo nanoparticles rather than Co—O or Co—$(OH)_2$ bonds. In addition, Co metal ions in a Co precursor receive more electrons from the electron-donating groups (—$CH_3$) of the carbon skeleton of poly(N-isopropylacrylamide) through the conjugated amide groups. As a result, electron transfer from electron-abundant Co to Pt is further enhanced on the surface of nanoparticles, and the formation of Co-N bonds on the surface prevents severe Co dissolution generated during a durability test. Therefore, the PtCo/C-PNIPAM catalyst disclosed herein has improved oxygen reduction activity and durability as compared to the conventional PtCo/C by virtue of electronic ensemble effects. It is expected that such electronic ensemble effects derived from organic/inorganic hybridization at the atomic level has a significant effect upon the development of multi-functional hybrid heterometallic nanomaterials.

The examples and experiments will now be described. The following examples and experiments are for illustrative purposes only and not intended to limit the scope of the present disclosure.

EXAMPLE 1

Preparation of C-PNIPAM

First, 0.3 g of carbon black (Vulcan XC-72R) and 0.4 mM of amine-terminated PNIPAM ($NH_2$-PNIPAM, average $M_n$=5500, Aldrich) are mixed in an acidic solution (pH 1.6) containing 300 mL of ethanol (Aldrich) and 0.6 mL of $HClO_4$ (Aldrich), subjected to ultrasonication for 30 minutes and agitated for 30 minutes at room temperature. Then, 0.4 mM of 1-ethyl-3-(3-dimethylaminopropyl)carbodiimide (EDC, Fluka) is added to the vigorously agitated solution as a catalyst to carry out amidation (reaction between —COOH on the carbon surface and —$NH_2$ of $NH_2$— PNIPAM). After carrying out amidation for 12 hours, the solution is washed and purified with distilled water. The purified C-PNIPAM is dried at 60° C. and C-PNIPAM powder is pulverized in a mortar.

EXAMPLE 2

Preparation of Catalyst

C-PNIPAM obtained from Example 1 is used as a carrier to prepare 40 wt % PtCo/C-PNIPAM. First, 0.15 g of C-PNIPAM is dispersed into 300 mL of ethanol and $PtCl_4$ (0.4 mmol), $CoCl_2.6H_2O$ (0.4 mmol) and sodium acetate (8 mmol) are added to the solution. To the solution, $NaBH_4$ (Aldrich) is added as a reducing agent under vigorous agitation. The resultant solution is agitated for 4 hours to quench the reaction. Finally, the solution is washed with distilled water and PtCo/C-PNIPAM is dried at 60° C. in an oven. In the case of PtCo/C, carbon black non-functionalized with PNIPAM is used as a carrier. PtCo/C is obtained by using the same materials in the same procedure as described above except the carbon carrier. In other words, $PtCl_4$ (0.2 mmol) is used for each of Pt/C and Pt/C-PNIPAM as a Pt precursor in an amount of 20 wt %. $CoC_2.6H_2O$ (0.64 mmol) is used for each of Co/C and Co/C-PNIPAM as a Co precursor in an amount of 20 wt %. Pt/C, Co/C and carbon black are used as carriers. C-PNIPAM is used instead of carbon black in the case of Pt/C-PNIPAM and Co/C-PNI-PAM. The resultant catalysts are heat treated at 200° C. under argon atmosphere for 2 hours.

TEST EXAMPLE 1

Formation of Pt—(Co-$N_{surface}$) surface in PtCo/C-PNIPAM

C-PNIPAM is obtained through the amidation between —COOH, functional groups on the surface of carbon black and —$NH_2$ of amine-terminated PNIPAM ($NH_2$-PNIPAM). Pt and Co precursors are mixed homogeneously in a solvent containing C-PNIPAM dispersed therein, and then a reduction agent (such as $NaBH_4$) is introduced to carry out reduction rapidly. To allow clear understanding about the effect of PNIPAM in the Co electronic structure, each of single metal nanoparticles of Pt and Co is further prepared with carbon in the presence or absence of PNIPAM. Conventional PtCo/C is also provided. Before the preparation of nanoparticles, the reaction between each metal precursor and PNIPAM is monitored by UV-VIS. As shown in FIG. 1 (portion b), the spectra between 400 nm and 800 nm show that only the Co precursor reacts with PNIPAM even though Pt and Co precursors are introduced together to the solvent. The Pt precursor shows weak absorption at 300-400 nm, but shows little charge transfer between the Pt precursor and PNIPAM. On the contrary, a drop in absorptivity of the Co precursor means electron transfer from PNIPAM to $Co^{2+}$ ions, which contributes to the formation of a $Co^{2+}$-PNIPAM complex. In other words, Co ion in the Co-precursor coexisting with PNIPAM has more electrons as compared to Co ion in the absence of PNIPAM, and thus exists more in a reduced state.

After the preparation of PtCo nanoparticles, the near-edge X-ray absorption fine structure (NEXAFS) of carbon is determined to demonstrate the carbon functionalization with PNIPAM and the interaction between metal nanoparticles and PNIPAM attached chemically to the carbon surface. The C K-edge appearing at 287-290 eV is derived generally from various functional groups on the carbon surface. The functionalization intensity at the above region is increased by the functional groups on the carbon surface and hybridization of metal nanoparticles. As shown in FIG. 1 (portion c), conventional carbon in the absence of PNIPAM and metal nanoparticles have low intensity in the above-mentioned energy region and the intensity is slightly increased by the functional groups on the carbon surface and interaction among PtCo nanoparticles after the preparation of PtCo/C. However, the C-PNIPAM functionalized with PNIPAM has high functionalization intensity due to the PNIPAM attached chemically to the carbon surface. In addition, PtCo/C-PNIPAM shows even higher intensity in the above-mentioned energy region, which results from the strong hybridization effect after forming PtCo nanoparticles on C-PNIPAM. As shown in FIG. 1(portion d), only the amide N peak derived from the fundamental structure of PNIPAM is observed in C-PNIPAM. On the contrary, formation of metal-N (Co—N or Pt—N) bonds is observed in PtCo/C-PNIPAM. As can be seen from FIG. 1 (portion b), the Pt precursor hardly reacts with PNIPAM containing a source of N, and thus Co-N bonds are formed rather than Pt—N bonds. It can be seen from the above results that Pt-(Co-$N_{surface}$) is formed successfully in PtCo alloy nanoparticles.

Figure 2:
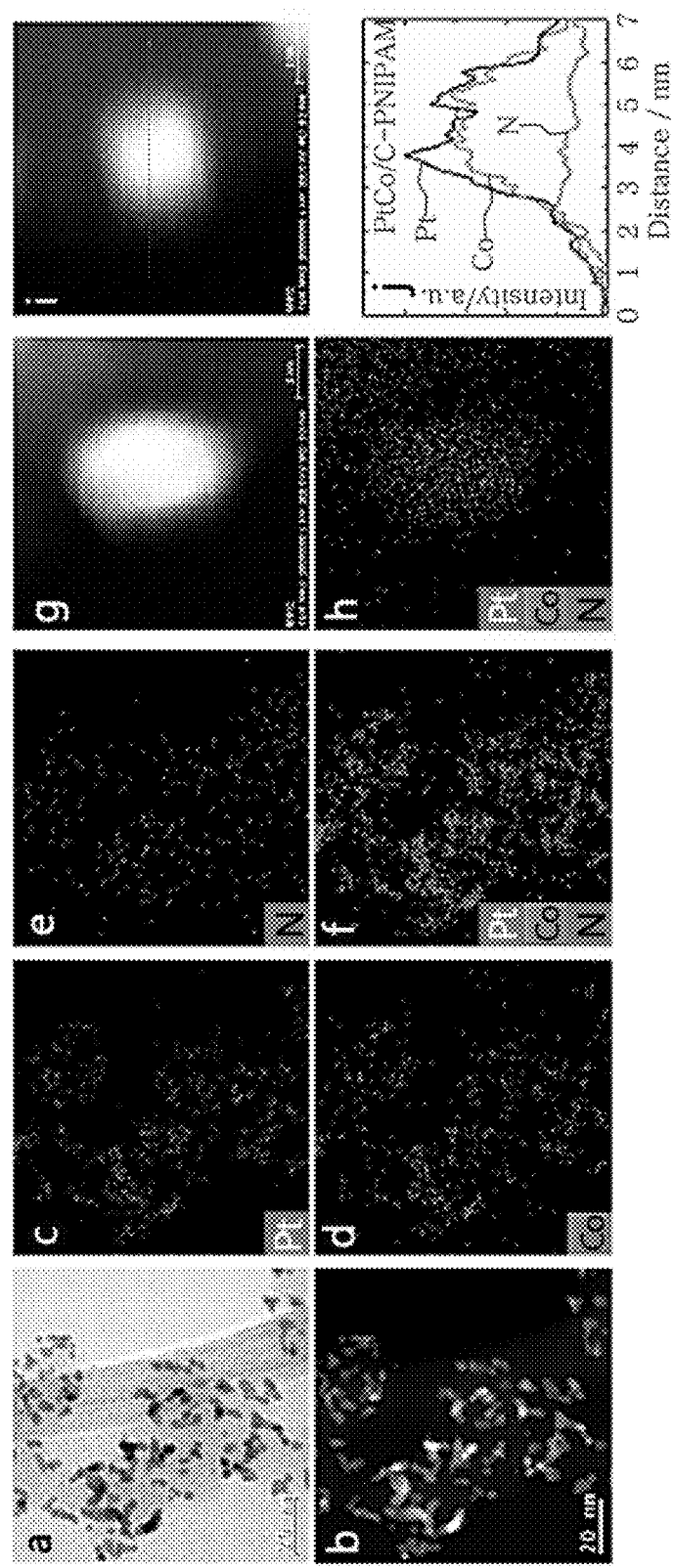
FIG. 2 shows Cs-corrected scanning transmission electron microscopic (STEM) images (portions a and b) of PtCo/C-PNIPAM; energy-dispersive X-ray spectroscopy mapping images when Pt (portion c), Co (portion d), N (portion e) or Pt, Co and N (portion f) are overlapped; an STEM image (portion g) and an EDX mapping image (portion h) when Pt, Co and N of nanoparticles are overlapped according to an embodiment; and an STEM image (portion i) and a line profile (portion j) of nanoparticles scanned along the green-colored line, according to an embodiment.
Figure 3A:
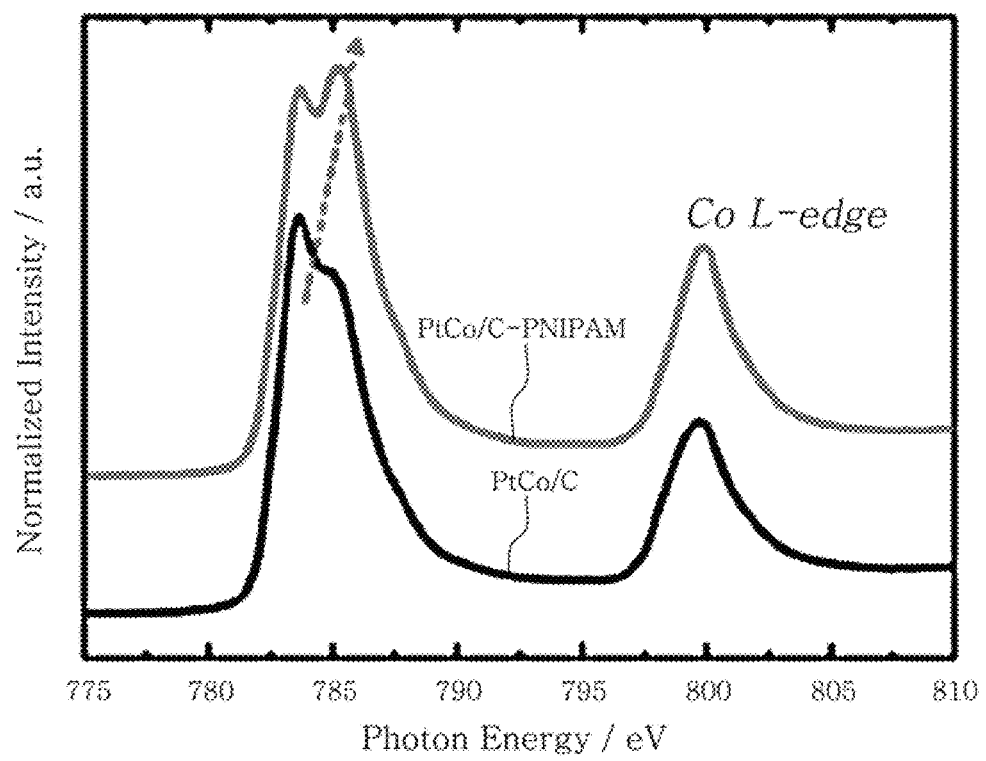
FIG. 3A to 3D show Co L-edge NEXAFS (FIG. 3A); PT $L_{III}$-edge X-ray absorption near-edge structure (XANES) (FIG. 3B); and XPS spectra (FIG. 3C and 3D) of the catalyst for oxygen reduction reaction according to an embodiment.
Figure 3B:
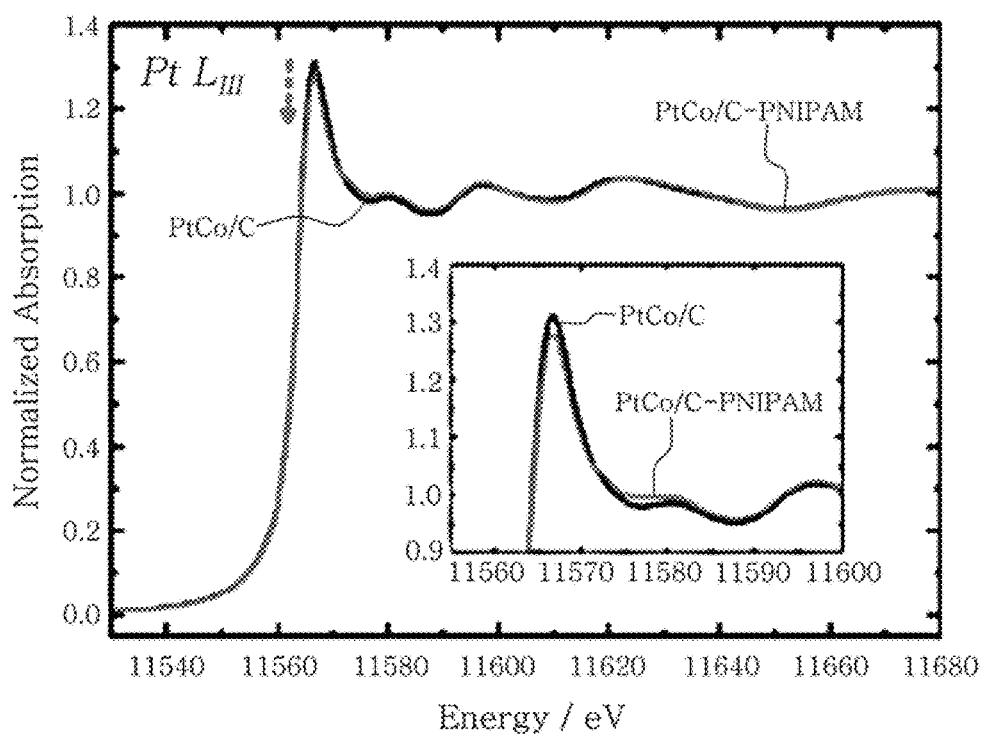
Figure 3C:
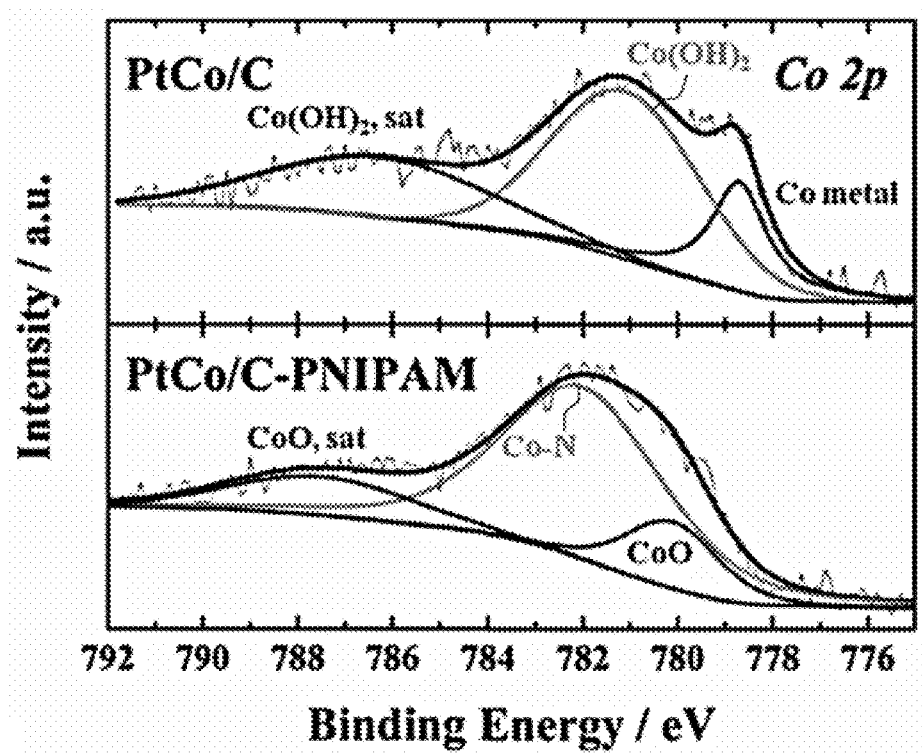
Figure 3D:
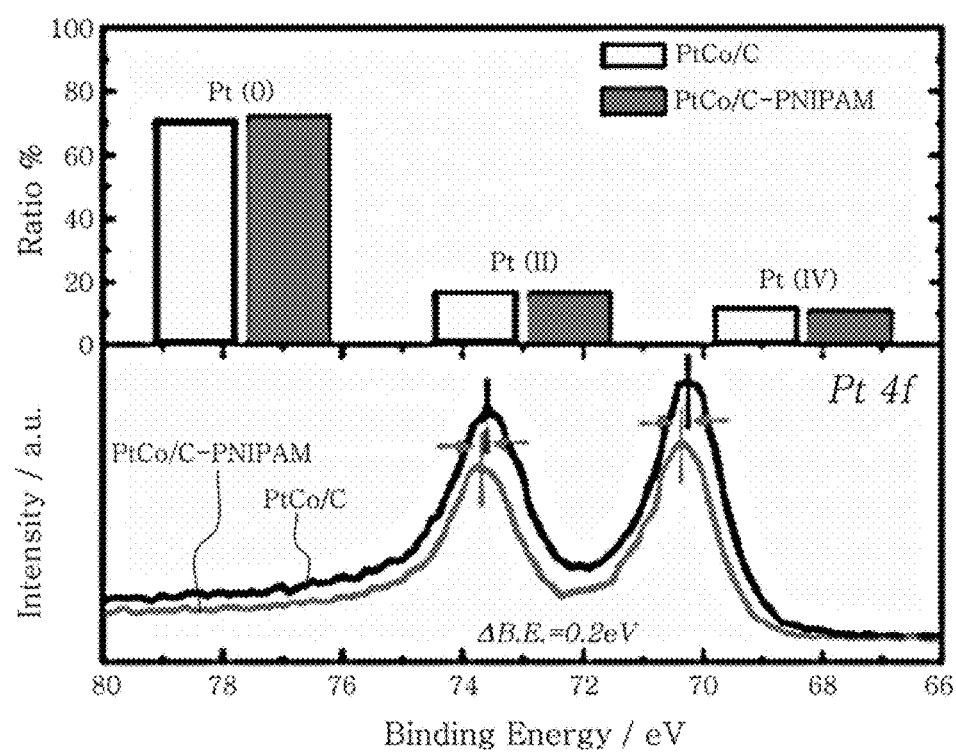

In order to determine the presence of Pt—(Co—$N_{surface}$) in PtCo/C-PNIPAM, a PtCo/C-PNIPAM sample is subjected to energy-dispersive X-ray spectroscopy (EDX) and line scanning by using a Cs-corrected scanning transmission electron microscope (STEM). The results are shown in FIG. 2. As shown in FIG. 2 (portions a-f), at a low magnification, N atoms are observed only on the PtCo nanoparticles, not the empty carbon surface. In addition, as shown in FIG. 2 (portions g-j), at a high magnification, coexistence of Pt, Co and N atoms is observed clearly in the EDX mapping and line profile.

TEST EXAMPLE 2

Electronic Ensemble Effect on Pt—(CO—$N_{surface}$) surface

When preparing a Pt—(Co—$N_{surface}$) surface by using a strong reducing agent, a difference in electronegativity between Pt and Co atoms increases, and thus excessive electrons on the Co atom surface may transfer instantly to the d-orbital of Pt. As can be seen from FIG. 3, the electronic structures of Pt and Co in PtCo/C-PNIPAM are changed rapidly by PNIPAM. As compared to FIG. 3 (portion a) and FIG. 3 (portion b) (illustrating Co L-edge NEXAFS and PT $L_{III}$-edge XANES, respectively), d-orbital of Co atom loses more electrons and the defect in Pt d-band decreases significantly. This suggests that electron transfer from Co to Pt is enhanced significantly.

Referring to chemical structures, a peak appears at 782.0 eV due to Co-N on the surface of PtCo/C-PNIPAM, as can be seen from Co 2p XPS spectra in FIG. 3 (portion c).

As can be seen from the foregoing, the electronic structure of Pt is tailored successfully by electronic ensemble effects between Pt and CO—$N_{surface}$ on the surface of PtCo nanoparticles, even when the active Pt surface is not blocked physically.

TEST EXAMPLE 3

Electrocatalytic Activity and Durability

Figure 4A:
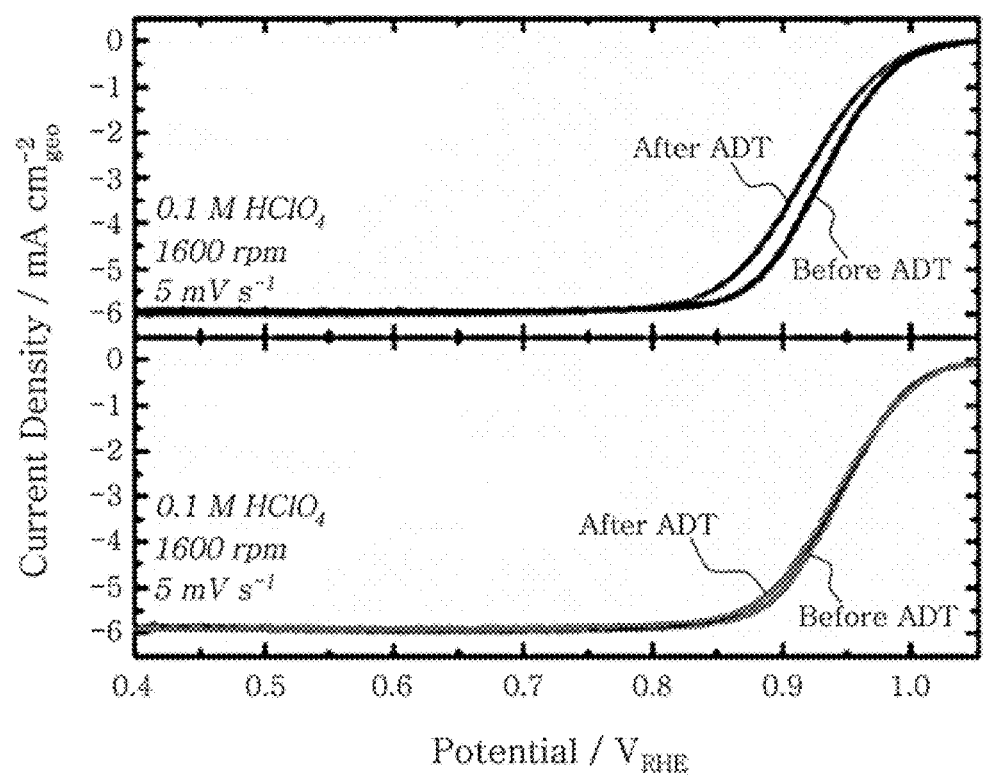
FIG. 4A to 4C show a polarization curve (FIG. 4A); a reaction current density graph (FIG. 4B); and a cyclic voltamogram (FIG. 4C), before and after the accelerated durability test (ADT) of the catalyst for oxygen reduction reaction according to an embodiment.
Figure 4B:
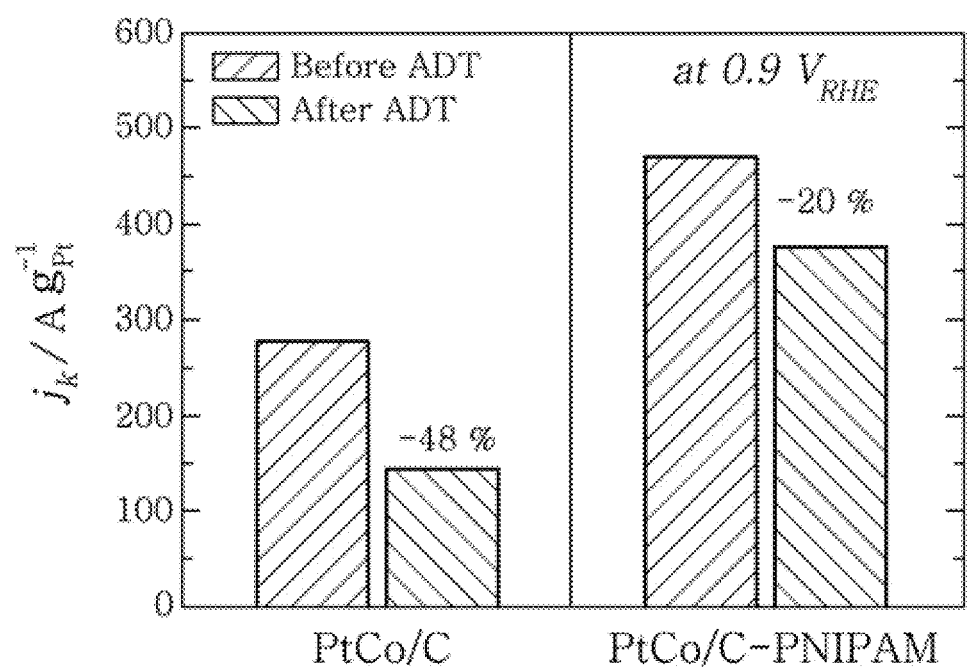
Figure 4C:
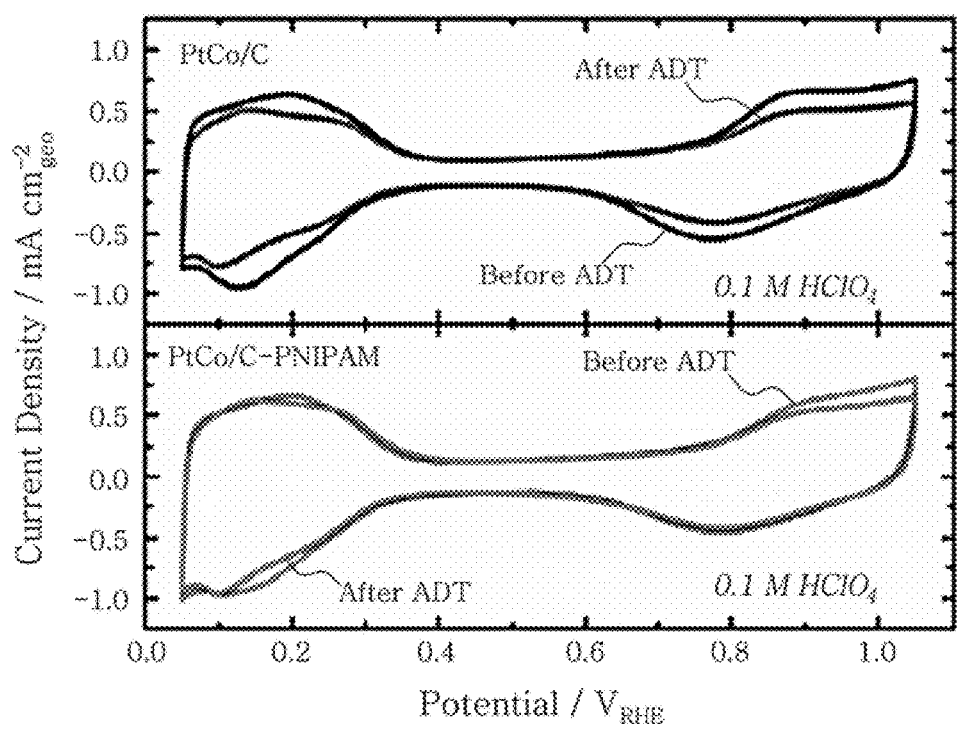

To carry out study about electrochemical properties of PtCo nanoparticles on which Pt—(CO—$N_{surface}$) is formed, an oxygen reduction reaction polarization curve and cyclic voltamogram are determined for PtCo/C-PNIPAM and PtCo/C, before and after an accelerated durability test (ADT). The results are shown in FIG. 4. As can be seen from FIG. 4 (portions a and b), PtCo/C-PNIPAM shows higher oxygen reduction activity and durability as compared to PtCo/C. PtCo/C-PNIPAM shows significantly improved initial oxygen reduction activity as compared to PtCo/C by virtue of a down-shift of Pt d-orbital caused by the electronic ensemble effects between Pt and Co—$N_{surface}$. The half wave potential of PtCo/C-PNIPAM is 0.95 VRHE, which is higher than that of PtCo/C, 0.93 VRHE. In addition, PtCo/C-PNIPAM having Co-N bonds maintains high oxygen reduction activity even after the accelerated durability test. It is thought that this is because the N atoms attached vertically to the surface of Co atoms inhibit additional oxidation of the surface Co atoms caused by external oxygen species ($O_2$ gas, $H_2O$, OH—).

In addition, as can be seen from FIG. 4 (portion c), the active surface of Pt atoms is retained physically during the formation of selective Co-N bonds in PtCo/C-PNIPAM. Thus, PtCo/C-PNIPAN and PtCo/C have a similar electrochemical surface area (ESA) before the accelerated durability test. However, after the accelerated durability, the electrochemical surface area of PtCo/C is decreased significantly, while that of PtCo/C-PNIPAM is not decreased substantially by virtue of the electrochemical stability of Co—N bonds near Pt (−3.1%). This is because the nitrogen moieties on the surface of Co atoms protect oxidative oxygen species from approaching Co atoms. As a result, it is possible to tailor the Pt electronic structure by virtue of surface ensemble effects through the selective CO—$N_{surface}$ bond formation near the surface of Pt atoms in order to enhance the oxygen reduction activity and to minimize degradation of catalytic activity of PtCo nanoparticles.

What is claimed is:
1. A catalyst for oxygen reduction reaction, comprising an alloy comprising at least one selected from Pt, Pd, and Ir supported on a carbon carrier functionalized with poly(n-isopropylacrylamide) (PNIPAM);
    wherein the alloy is an alloy of a metal selected from the group consisting of Pt, Pd, and Ir with a transition metal selected from the group consisting of Co, Ni, Fe, Cu, Cr, and Mn;
    wherein a chemical bond between the transition metal and nitrogen of amide group of PNIPAM is formed on the surface of the alloy, and the chemical bond between the transition metal and nitrogen of amide group of PNIPAM prevents severe dissolution of the transition metal; and
    wherein the alloy comprising at least one selected from Pt, Pd, and Ir is present in an amount of 10-45 wt % based on the total weight of the catalyst; and
    wherein the alloy comprising at least one selected from Pt, Pd, and Ir is nanoparticles having a particle diameter 5-20 nm.

2. The catalyst for oxygen reduction reaction according to claim 1, wherein the alloy comprising at least one selected from Pt, Pd, and Ir is nanoparticles.

3. The catalyst for oxygen reduction reaction according to claim 1, which is represented by the following Chemical Formula 1:

XY/C-PNIPAM            [Chemical Formula 1]

wherein X is at least one selected from the group consisting of Pt, Pd, and Ir, Y is at least one selected from the group consisting of Co, Ni, Fe, Cu, Cr, and Mn, C is carbon, and PNIPAM is poly(N-isopropylacrylamide).

\* \* \* \* \*